United States Patent
Ueberle et al.

(10) Patent No.: US 9,409,295 B2
(45) Date of Patent: Aug. 9, 2016

(54) METHOD FOR CONTROLLING A ROBOT

(71) Applicant: KUKA Laboratories GmbH, Augsburg (DE)

(72) Inventors: Marc-Walter Ueberle, Friedberg (DE); Hartmut Keyl, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/460,811

(22) Filed: Aug. 15, 2014

(65) Prior Publication Data

US 2015/0057799 A1 Feb. 26, 2015

(30) Foreign Application Priority Data

Aug. 20, 2013 (DE) .......................... 10 2013 013 875

(51) Int. Cl.
*B25J 9/16* (2006.01)
*G05B 23/02* (2006.01)

(52) U.S. Cl.
CPC .............. *B25J 9/1674* (2013.01); *B25J 9/1651* (2013.01); *G05B 23/0291* (2013.01); *G05B 2219/40204* (2013.01); *G05B 2219/42319* (2013.01)

(58) Field of Classification Search
CPC .. B25J 9/1651; B25J 9/1674; G05B 23/0291; G05D 23/27518
USPC ................................ 700/253, 174, 177, 178; 318/560–568.25
See application file for complete search history.

(56) References Cited

U.S. PATENT DOCUMENTS

| | | | |
|---|---|---|---|
| 7,102,311 B2* | 9/2006 | Nishimura et al. | ............ 318/280 |
| 7,102,315 B2* | 9/2006 | Nakata et al. | ............ 318/568.22 |
| 8,219,245 B2* | 7/2012 | Merk et al. | ..................... 700/250 |
| 2007/0163322 A1 | 7/2007 | Hirakawa et al. | |
| 2010/0057252 A1 | 3/2010 | Kim | |
| 2010/0145515 A1 | 6/2010 | Nakanishi et al. | |

FOREIGN PATENT DOCUMENTS

| CN | 101667026 A | 3/2010 |
|---|---|---|
| CN | 102591338 A | 7/2012 |
| DE | 19533604 A1 | 3/1997 |
| DE | 19739736 A1 | 3/1999 |
| DE | 112005000184 T5 | 11/2006 |
| DE | 102007028390 A1 | 12/2008 |
| DE | 102008015948 A1 | 10/2009 |

(Continued)

OTHER PUBLICATIONS

German Patent Office; Search Report in German Patent Application No. 10 2013 013 875.2 dated Mar. 28, 2014; 8 pages.

(Continued)

*Primary Examiner* — Dalena Tran
(74) *Attorney, Agent, or Firm* — Wood, Herron & Evans, LLP

(57) ABSTRACT

A method for controlling a robot includes monitoring the robot, and carrying out a fault reaction, selected from a number of specified fault reactions, on the basis of the monitoring of the robot, wherein the fault reaction is selected on the basis of a monitoring of an operational capability and/or an output variable of at least one motor of the robot.

18 Claims, 1 Drawing Sheet

(56) References Cited

FOREIGN PATENT DOCUMENTS

| | | |
|---|---|---|
| DE | 102008021671 A1 | 11/2009 |
| DE | 102008024950 A1 | 11/2009 |
| DE | 102010022931 A1 | 12/2011 |
| DE | 102010048369 A1 | 4/2012 |
| EP | 1598156 A1 | 11/2005 |
| EP | 2113344 A1 | 11/2009 |
| EP | 2199037 A2 | 6/2010 |
| EP | 2639662 A2 | 9/2013 |
| JP | 9076184 A | 3/1997 |
| JP | 2000066706 A | 3/2000 |
| JP | 2010137312 A | 6/2010 |
| KR | 20100028359 A | 3/2010 |

OTHER PUBLICATIONS

Chinese Patent Office; Search Report and Examination Report in Chinese Patent Application No. 201410412385.2 dated Aug. 27, 2015; 14 pages.

European Patent Office; Search Report in European Patent Application No. 114 00 2760.8 dated Apr. 13, 2016; 9 pages.

Korean Patent Office; Office Action in Korean Patent Application No. 2014-0107986 dated Jan. 20, 2016; 5 pages.

Chinese Patent Office; The Second Office Action in Chinese Patent Application No. 201410412385.2 dated Mar. 11, 2016; 16 pages.

* cited by examiner

METHOD FOR CONTROLLING A ROBOT

TECHNICAL FIELD

The present invention relates to a method for controlling a robot, a computer program product for carrying out such a method, and a robot having such a control.

BACKGROUND

Robots are monitored in accordance with internal operating practice; and on the basis of the monitoring fault reactions are carried out; in particular, the robot is slowed down to a stationary state.

In this context, a number of different fault reactions can be carried out. Thus, it is possible to execute, in particular, a so-called STOP 0, in which mode one or more motors are immediately disconnected from an energy supply and mechanical brakes engage. However, this fault reaction has a number of drawbacks. For example, the result of such a fault reaction may be a longer decelerating path and/or a higher load on the robot. Furthermore, slowing the robot down to a stationary state during this fault reaction depends exclusively on the mechanical brake. In addition, in the course of stopping the robot, the robot may deviate from a defined path.

Therefore, a so-called STOP 1 or STOP 2 can also be carried out in accordance with internal operating practice. In this case, one or more motors act initially as the motor brakes and only subsequently are they disconnected from an energy supply (STOP 1) or remain connected to said energy supply (STOP 2). This arrangement makes it possible to shorten the decelerating path and/or to reduce the load on the robot. In addition to the mechanical brake, an additional brake is available with the motor brake, a feature that increases the reliability of the fault reaction. One advantage is that it is possible to decelerate with maximum path accuracy.

However, such a motor-active fault reaction assumes, in particular, that the corresponding motors are functioning satisfactorily. If this operational capability is not sufficiently ensured, then correspondingly when the motor-active fault reaction fails, it will be necessary to switch over to a disadvantageous reaction, for example a STOP 0, or it may even be necessary to provide said STOP 0 in advance. If the switchover occurs on the basis of a kinematic monitoring, for example, a position-based or speed-based monitoring of the braking ramp, then this approach may give rise to the disadvantage of an extended reaction time.

SUMMARY

The object of the present invention is to improve the operation of a robot.

According to one aspect of the present invention, a robot is monitored, in particular, by way of a monitoring means for monitoring a robot. This monitoring is also referred to hereinafter as the robot monitoring.

The present invention may be implemented in hardware and/or software. For example, hardware can comprise, in particular, a processing unit, which is connected preferably to a memory system and/or a bus system by means of data and/or signals, and is, in particular, a digital processing unit, in particular, a microprocessor unit (CPU) and/or comprises one or more programs or program modules. For this purpose, the CPU can be configured to execute commands, which are implemented as a program stored in a memory system, to collect input signals from a databus and/or to send output signals to a databus. A memory system can comprise one or more, in particular different, storage mediums, in particular, optical, magnetic, solid state, and/or other non-volatile mediums. The program can be configured in such a way that it embodies the described methods, or more specifically, is capable of executing the methods described herein, so that the CPU can carry out the steps of such methods and, as a result, can control, in particular, the robot. In the present invention, the term "control" may be construed, as a general principle, as a closed loop control, i.e., an input of manipulated variables on the basis of the specified target variables and the actual variables that are sensed.

In one embodiment, the monitoring of the robot comprises the sensing of one or more, in particular kinematic, state variables of the robot, in particular one or more joint coordinates and/or a position and/or orientation of one or more robot-fixed references, in particular, a tool reference system ("tool center point", TCP), and/or a time derivation thereof, in particular, thus, one or more joint speeds and/or joint accelerations and/or speeds and/or accelerations of one or more robot-fixed references. In addition or as an alternative, the monitoring of the robot may comprise the sensing of one or more force variables of the robot, in particular, one or more drive-sided and/or output-sided joint forces and/or forces at and/or on one or more robot-fixed references. For a more concise presentation, the anti-parallel force pairs, i.e., the torques, are called, as a general principle, the force for purposes of the present invention. In addition or as an alternative, the monitoring of the robot may comprise the sensing of one or more additional state variables of the robot, in particular, thermal state variables, such as a temperature of one or more motors or the like. In addition or as an alternative, the monitoring of the robot may comprise the sensing of one or more environmental variables of the robot, in particular the presence of impediments, a state of a protective device, such as whether a safety door is closed or whether an emergency stop switch has been actuated or not, or the like. For this purpose, the monitoring means for monitoring the robot may comprise corresponding sensors, in particular, joint sensors, such as encoders, rotary transducers or the like; force sensors, in particular, torque sensors; temperature sensors; space monitoring sensors; protective devices monitoring sensors; emergency stop switches or the like.

In a further development, the monitoring of the robot comprises the comparison of one or more of the sensed variables with specified constant limit values or variable limit values, in particular for a position and/or speed of the robot, a force, which acts on the robot and/or is exerted by the robot on its environment, or the like. In one embodiment, the monitoring of the robot comprises a monitoring of a predefined space, in particular, a Cartesian workspace and/or a protected zone, which the robot may not leave and/or into which the robot may not penetrate, and/or a joint coordinate space, in particular, a corresponding joint coordinate space; a monitoring of a one dimensional or multi-dimensional speed, in particular a speed of a robot-fixed reference and/or a joint speed; a collision monitoring; a deceleration monitoring, in particular, the maintenance of specified delays; and/or a monitoring of a stationary state.

On the basis of the robot monitoring, a fault reaction, which has been selected from a number of specified fault reactions, in particular, by means of a selection means, is carried out, in particular, by means of a fault reaction means.

In one embodiment, the number of specified fault reactions comprises one or more motor-active fault reactions and one or more motor-passive fault reactions. A motor-active fault reaction, as defined for the purpose of the present invention, may be construed, in particular, as a fault reaction, in which one or more (drive) motors, in particular, all of the (drive) motors of the robot are actuated, in particular, are controlled. A motor-passive fault reaction may be construed correspondingly as a fault reaction, during which this motor or these motors is and/or are not actuated and not driven. In one embodiment, a motor-active fault reaction is characterized in that the target values, in particular, the target position values, the target speed values, the target force values and/or the target current values are generated for at least one motor and are transmitted to said at least one motor, whereas a motor-passive fault reaction is characterized in that this motor is disconnected from its energy supply.

A motor-active fault reaction can be, in particular, a so-called STOP 1. Correspondingly, the number of specified fault reactions in one embodiment comprises a motor deceleration of one or more (drive) motors, in particular, all of the (drive) motors of the robot with a subsequent disconnection from the energy. In the present invention, the term "motor deceleration" may be construed, in particular, as the control of the motor(s) in such a way that this motor or these motors acts and/or act against a movement of the robot or more specifically decelerates and/or decelerate said robot, preferably slows or slow down said robot to a stationary state. In the present invention, the term "subsequent disconnection from the energy" may be construed, in particular, as an interruption of the motor or an isolation of the motor from an energy supply, after the corresponding motor has stopped, and in a further development a mechanical brake has been engaged or, more specifically, has been applied.

A motor-active fault reaction can also be, in particular, a so-called STOP 2. Correspondingly, the number of specified fault reactions in one embodiment comprises a motor deceleration of one or more (drive) motors, in particular, all of the (drive) motors of the robot without subsequently disconnecting the motor from the energy or rather in such a way that the corresponding motor remains connected to its energy supply even after having reached a stationary state.

A motor-active fault reaction can also be, in particular, a so-called compliance control. In the present invention this term "compliance control" may be construed as a control of one or more (drive) motors, in particular, all of the (drive) motors of the robot in such a way that the robot can be moved manually; it may be construed, in particular, as a so-called gravity compensation control, in which the robot holds a pose only in the absence of external forces and otherwise yields or more specifically gives way to external forces, in particular, manually impressed forces. A compliance control can be implemented, for example, by reducing a proportional share and/or by eliminating an integral share of a PI(D) position controller, by controlling the force, in particular, with an input of a zero force, exerted by the robot on the environment, or the like.

A motor-active fault reaction may also be, in particular, a retraction motion. In the present invention this term "retraction motion" may be construed, in particular as a control of one or more (drive) motors, in particular, all of the (drive) motors of the robot in such a way that on a predefined path the robot withdraws from a pose that said robot assumed on or after the initialization of the monitoring of the robot, for example, upon detection of a collision. In particular, the motors can be reversed in the opposite direction of an actuation prior to the fault reaction, in order to retract the robot, preferably in that the robot traverses a path, on which the robot was moving until the fault reaction, in the opposite direction.

In a further development, a motor-active fault reaction may comprise an engagement of one or more mechanical brakes before, during or after reaching a stationary state.

A motor-passive fault reaction may also be, in particular, a so-called STOP 0. Correspondingly, the number of specified fault reactions in one embodiment comprises an immediate disconnection of one or more motors, in particular, all of the motors of the robot from the energy without deceleration of the motor. An additional motor-passive fault reaction may be, for example, the engagement of mechanical locking systems or, more specifically, mechanical blocking systems.

According to one aspect of the present invention, an operational capability of one or more motors, in particular, all of the motors, in particular, the drive motors, of the robot is monitored by, in particular, a monitoring means for monitoring an operational capability of least one motor of the robot and, in particular, by means of a selection means. The fault reaction, which is to be performed, for one or more motors, in particular, all of the motors, in particular, the drive motors of the robot is selected on the basis of this monitoring of the operational capability of the motor(s) of the robot. In the present invention, this term "drive motor" is defined, in particular, as a motor for actuating a joint or more specifically the degree of freedom of the robot. In one embodiment the motor(s) is and/or are electric motors, in particular, synchronous motors, asynchronous motors or dc electric motors. The monitoring is also referred to hereinafter as the functionality monitoring.

The selected fault reaction, which is to be carried out, may be motor-specific. In the present invention, this term "motor-specific" is understood to mean, in particular, that the operational capability of at least one motor of the robot is monitored, and on the basis of this monitoring a fault reaction is selected and executed for this motor. In one embodiment an operational capability of a first motor of the robot is monitored accordingly; and on the basis of this first functionality monitoring, a fault reaction is selected and executed for this first motor; and, in particular, in parallel and/or independently an operational capability of a second motor of the robot is monitored; and on the basis of this second functionality monitoring a fault reaction is selected and executed for this second motor.

Similarly, the selected fault reaction, which is to be carried out, may pertain globally to all of the robots. In the present invention, this concept "globally to all of the robots" is understood to mean, in particular, that the operational capability of one or more (drive) motors, in particular, all of the (drive) motors of the robot are monitored, and on the basis of this global functionality monitoring a fault reaction is selected and executed for all of the motors, in particular all of the drive motors.

According to this aspect, the most advantageous fault reaction that is available can be carried out in one embodiment in such a way that it is adapted to the situation in an advantageous way. In particular, a motor-active fault reaction, for example, a STOP 1, a STOP 2, a compliance control or a retraction motion can be carried out, if and/or as long as the motors, which are necessary for this purpose, are functioning properly. Otherwise, in particular, an additional motor-active fault reaction, for which these motors are not needed, can be carried out; or a motor-passive fault reaction can be carried out. The advantage of this arrangement is that it is no longer necessary to provide in advance a fault reaction, which by itself is less advantageous, because the reliability of the motors is not guaranteed.

In one embodiment, the fault reaction can be preselected in advance or more specifically prior to executing the fault reaction. In particular, the operational capability can be constantly or periodically monitored; and on this basis a fault reaction can be preselected. Then this fault reaction is already preselected and can be carried out immediately, if this is necessary on the basis of the monitoring of the robot. Thus, for example, a STOP 1 can be preselected, as long as the motors of the robot are in complete good working order. If it is determined that at least one of the motors is not functioning properly, then a STOP 0 is preselected. This strategy makes it possible in one embodiment to actuate or, more specifically, to carry out immediately the best available fault reaction by means of the robot monitoring.

In addition or as an alternative, the fault reaction can be selected, in particular, can be modified or rather changed, while carrying out the fault reaction. Thus, for example, it is possible in a first step to (pre)select and to carry out a STOP 1. If then while executing STOP 1 it is determined that at least one of the motors is no longer functioning properly, a change-over is performed, for example, to a STOP 0, which is then carried out in the next step.

One embodiment provides that in order to monitor an operational capability of a motor, one or more parameters of the motor are determined, in particular, by means of a determination means and can be compared with a given specification, in particular, by means of a comparison means. One or more parameters, in particular, all of the parameters can be, in particular, electromagnetic parameters, in particular, a one dimensional or multi-dimensional current variable, voltage variable, resistance variable and/or magnet variable of one or more windings of an electric motor, in particular, an interlinked flux and/or a torque constant and/or a voltage constant of the motor. For a more concise presentation, strictly electric variables and variables, which can be derived from these electric variables, in particular by means of signal processing methods, such as filtering methods, Fourier analysis and/or spectral analysis, are also referred to as electromagnetic parameters in the present invention. In addition or as an alternative, the parameters may be thermal parameters, in particular a one dimensional or multi-dimensional temperature variable. In addition or as an alternative, the parameters may be the kinematic parameters of the motor, in particular a one dimensional or multi-dimensional position error or the like. In addition or as an alternative, the parameters may be derived from, in particular, may consist of residues, which are determined from a comparison of the sensed output variables of the motor, in particular, a motor position, a motor speed, a motor current and/or a motor output torque, with the expected values for these variables.

In one embodiment, one or more parameters are acquired directly. Similarly, one or more parameters may be acquired on the basis of a model, in particular, by means of a parameter identification method, preferably an on-line parameter identification method, and/or by means of a (fault) observer and/or by means of so-called parity equations. Thus, for example, a defective motor bearing can be detected by observing an output torque.

One or more parameters are compared with a given specification. The given specification can be constant, in particular, unalterable and in one embodiment may comprise the characteristics of the motor, for example, a torque constant, no load power consumption, a bearing torque or the like. Similarly, the given specification can also be variable, in particular, can be changed during the on-going operation or at a startup. Hence, it may be advisable to make the specification tougher, if the robot cooperates with another robot or with a human, because then the requirements with respect to decelerating to a stop are more stringent.

The operational capability of a motor can also be given by means of a one dimensional or multi-dimensional continuous variable, in particular, by means of a difference, preferably a normalized difference between one or more of the determined parameters and their specification, in particular, a standard value or range. Similarly, the monitoring of an operational capability may also comprise a two or more step classification of an operational capability. Thus, in particular, a motor can be classified as (fully) operational, if and/or as long as all of the determined parameters are within their specification, in particular within a specified permissible range. A motor can be classified as non-operational or more specifically defective, if and/or as long as at least one parameter, in particular, a parameter that is specified as relevant, is outside its specification. Correspondingly, it may be sufficient in one embodiment, if (any) one parameter is outside its specification, in order to classify the motor as defective. In contrast, an additional embodiment provides that the motor can stay classified as operational, as long as at least all of the parameters that are specified as essential are within their specification.

In a further development such a two step classification of "operational" or "non-operational", can be broken down even more into a three step or multi-step classification. Thus, in particular, a motor can be classified as capable of functioning to a limited extent, if and/or as long as all of the parameters or at least all of the parameters that are specified as relevant are outside their given specification, but are still within a given additional specification.

In one embodiment, this approach enables a differentiated selection of the fault reaction. Therefore, one embodiment provides that when the robot is monitored for speed, a STOP 2 can be selected, as long as the motors are classified as fully operational or at least capable of functioning to a limited extent, because in this case a reduced motor deceleration with motors that are capable of functioning to a limited extent usually suffices; and a STOP 0 can be selected, if at least one motor is classified as non-operational. Inversely, one embodiment provides that when monitoring a workspace, for which the requirements for stopping the robot on the basis of the monitoring are higher, a STOP 2 can be selected, as long as the motors are classified as fully operational; and a STOP 0 can be selected, if at least one motor is classified as capable of functioning only to a limited extent or as non-operational.

Robot monitoring and functionality monitoring can coincide, at least partially, or more specifically can be configured or carried out by means of the same monitoring means. Thus, for example, the monitoring of the joint forces during collision monitoring can detect, on the one hand, a collision of the robot with its environment on the basis of an unplanned force characteristic, in particular, a sudden increase in force. On the other hand, the monitoring of joint forces, for example, by means of a slower continuous increase in force, can detect a steadily increasing friction at the bearing or the like, which has a negative impact on the operational capability of the motor.

In addition or as an alternative, the fault reaction, which is to be carried out, for one or more motors, in particular, all of the motors, in particular, the drive motors, of the robot can be selected on the basis of the functionality monitoring and the robot monitoring. Thus, for example, the robot monitoring can comprise a collision monitoring or more specifically collision detection and a stationary state monitoring and can select a motor-active fault reaction, when the collision detection means responds, and can select a motor-passive fault reaction, when the stationary state monitoring means responds. Then the functionality monitoring can also (pre-)select the motor-passive fault reaction or can change over to said motor-passive fault reaction for the collision monitoring, when a motor-active fault reaction is not possible or is not advantageous because the motor(s) is and/or are not in good working order.

According to an additional aspect of the present invention, a one dimensional or multi-dimensional output variable of one or more motors, in particular, all of the motors, in particular, the drive motors, of the robot is monitored, in particular, by a monitoring means for monitoring an output variable of at least one motor of the robot and is selected, in particular, by means of a selection means; and the fault reaction, which is to be carried out, for one or more motors, in particular, all of the motors, in particular, the drive motors of the robot is selected on the basis of this monitoring of the output variable of the motor(s) of the robot, in particular, is changed from a motor-active to a motor-passive fault reaction. The monitoring is also referred to hereinafter as the output variable monitoring. Thus, in one embodiment this output variable monitoring can be combined with the functionality monitoring described above.

In one embodiment, an output variable of a motor can comprise, in particular, can be a force, in particular, an antiparallel force pair and/or a torque, wherein said output variable or more specifically said force pair of the motor is exerted on a joint axis of the robot, in particular a torque, which is sensed at an output shaft of the motor or a gear unit that is connected to said output shaft, and/or is calculated, in particular, on the basis of the sensed motor currents and motor characteristics, in particular a torque constant. In addition or as an alternative, an output variable can comprises a (time) integral variable thereof, in particular a work and/or power.

For the purpose of a more concise presentation, a deviation of a force or a variable, which determines this force, in particular, a variable of a motor current, from a specified target force or more specifically a target variable, which determines this target force, is also referred to herein as the force. Correspondingly, one embodiment provides that an output variable of a motor can comprise, in particular, can be a deviation of an actual force from a specified target force, in particular, a torque control error or rather a torque control tracking error and/or a motor current control error or rather a motor current tracking error.

As stated above, a motor-active fault reaction, for example, a STOP 1 or STOP 2, may be advantageous, in particular, in the course of slowing down a so-called braking ramp, wherein one or more motors of the robot affect predetermined delays. To date, the maintenance of such a braking ramp has been monitored, according to internal operating practice, by monitoring a position profile or speed profile. If, instead or in addition, according to this aspect the output variable of the decelerating motor or more specifically the output variables of the decelerating motors are also monitored, then in this case a fault can be detected at an earlier stage. Because, while the position or speed monitoring can detect a faulty braking torque only when the robot reacts, said reaction being subject to inertia, and, in addition, has to be configured in such a way that it is robust with respect to the dynamic reaction moments, in particular, the acceleration moments and weight moments, and external fault moments, the output variable monitoring is already monitoring this braking torque on its own and, in so doing, can quickly change over, for example, to a STOP 0. A further development provides, in particular, for this purpose that the output variable monitoring can be carried out, instead of in a robot control unit, directly in the motor or joint control unit, in particular, of a power electronics system of the motor.

According to an additional aspect of the present invention, which can be combined with one or more of the aspects described above, one or more (drive) motors, in particular, all of the (drive) motors of the robot are controlled by a first control means in the normal operating mode and in the event of a fault reaction are controlled by a second control means, which is different from the first control means and which is implemented in safe technology in one embodiment. A control means, which is implemented in safe technology, may be, as defined for the purpose of the present invention, in particular, redundant, fail-safe and/or exhibit diversity or at least be in compliance with the control category 2 according to EN 954-1.

According to internal operating practice, the (drive) motors are controlled in non-safe technology and are only monitored in safe technology. Since, as stated above, a motor is monitored during a motor-active fault reaction, it is possible to switch over, if necessary, to a motor-passive fault reaction. In addition or as an alternative, it is also possible according to this aspect of the present invention that the second control means, which is implemented in safe technology, take over the control of the motor during a fault reaction, in particular during a motor-active fault reaction.

BRIEF DESCRIPTION OF THE DRAWINGS

Additional advantages and features will be apparent from the dependent claims and the exemplary embodiments. For this purpose the drawings show to some extent in schematic form in FIG. 1: a robot with a plurality of drive motors and a control means according to one embodiment of the present invention.

DETAILED DESCRIPTION

Figure 1:
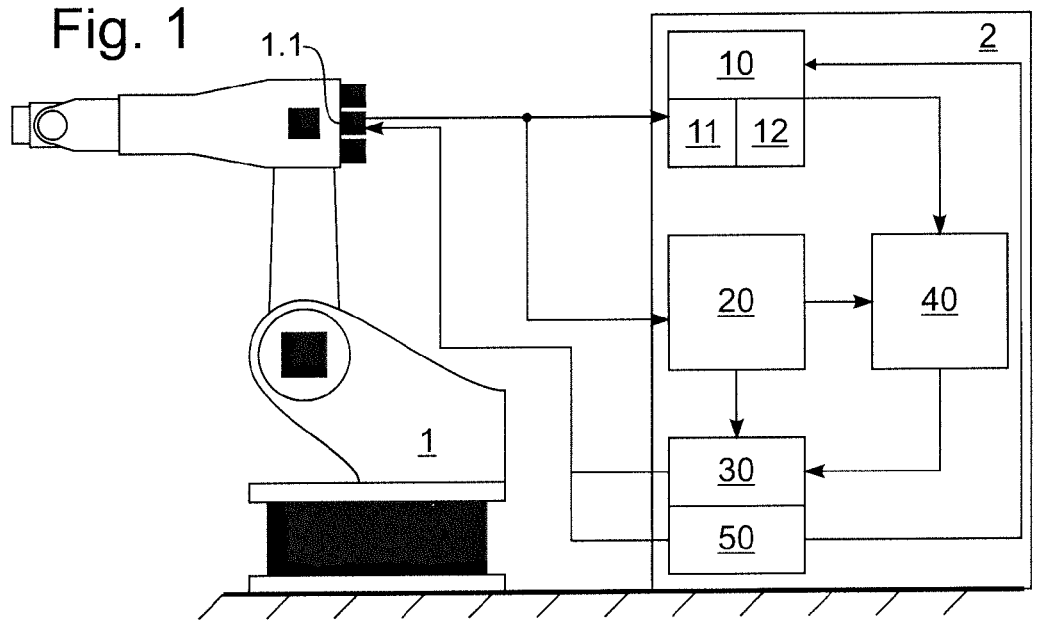
Figure 2:
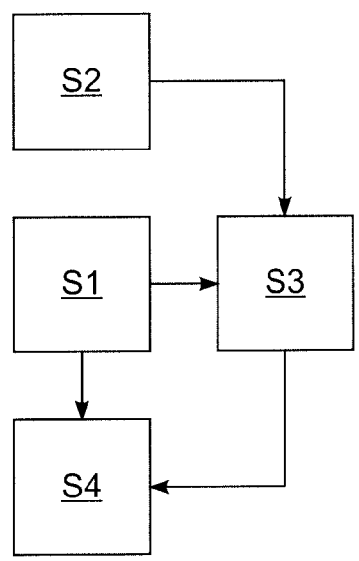
FIG. 2: a method for controlling the robot from FIG. 1 according to one embodiment of the present invention.

FIG. 1 shows a robot 1 with a plurality of drive motors and a control means in the form of a robot control unit in a control cabinet 2 according to one embodiment of the present invention. FIG. 2 shows a method for controlling this robot according to one embodiment of the present invention, wherein this method is carried out by the control means 2.

For a better overview, the control means and the method are explained below only with reference to one drive motor 1.1 of the robot; hence, the explanations also apply mutatis mutandis to the other drive motors.

The control means for purposes of controlling comprises the following means, which are implemented in hardware and/or software: a robot monitoring means 20 for monitoring the robot 1; a functionality monitoring means 10 for monitoring an operational capability and an output variable of the motor 1.1, as well as its additional drive motors; a fault reaction means 30 for carrying out a fault reaction, selected from a number of specified fault reactions, on the basis of the monitoring of the robot by means of the robot monitoring means 20; and a selection means 40 for selecting the fault reaction on the basis of a monitoring of an operational capability and an output variable of the motors of the robots, wherein the control means is configured for carrying out the process, shown in FIG. 2.

In a normal operating mode, the drive motors of the robot are controlled by a first control means 50, which is implemented in fail-safe technology. For example, the first control means 50 gives the position commands to the motor control units of the drive motors or gives the current commands to its power electronics system, as indicated by a directional communications arrow in FIG. 1.

In a step S1, the robot monitoring means 20 monitors the robot. For example, said robot monitoring means senses the currents, positions, speeds and/or torques of the drive motors. The robot monitoring means 20 can perform a speed monitoring, in particular, by comparing the specified speed limits and the sensed speeds, if desired, after transformation to a robot-fixed reference. In addition or as an alternative, the robot monitoring means 20 can carry out a collision monitoring by comparing the sensed torque levels with the specified torque limit values.

In a step S2 the functionality monitoring means 10 monitors an output variable of the drive motors. For this purpose, said functionality monitoring means can sense, for example, directly the torque levels of the drive motors, as indicated by the interlinked communications arrow in FIG. 1. Similarly, said functionality monitoring means can sense the currents and can transform them to output torques.

In addition, in step S2 the functionality monitoring means 10 monitors an operational capability of the drive motors. For this purpose said functionality monitoring means can determine an operational capability, for example, by means of a parameter identification on the basis of the sensed positions, speeds, voltages, currents and/or torques and can classify each motor as fully operational, if the sensed parameters, for example, a torque constant, are within a specification. If the parameters are outside this specification, but still inside an additional specification, then in step S2 said functionality monitoring means 10 classifies the corresponding motor as capable of functioning to a limited extent. If at least one parameter is also outside the additional specification, then in step S2 said functionality monitoring means 10 classifies the corresponding motor as non-operational or more specifically defective.

The functionality monitoring means 10 transmits of this classification to the selection means 40, which in a step S3 selects one of a plurality of fault reactions on this basis. As indicated by the corresponding arrows in FIGS. 1 and 2, the selection means 40 also selects the fault reaction on the basis of the monitoring by means of the robot monitoring means 20.

In the exemplary embodiment, the number of selectable fault reactions comprises a STOP 0, a STOP 1, a STOP 2, a compliance control of the drive motors and a retraction motion by traversing a specified, previously travelled path in the opposite direction.

The exemplary embodiment provides that in step S3 the selection means 40 selects a STOP 2 for the speed monitoring, as long as the functionality monitoring means 10 determines that all of the drive motors are fully operational or are at least capable of functioning to a limited extent. Otherwise, said functionality monitoring means selects a STOP 0. In step S3, the selection means 40 selects a compliance control for the collision monitoring, as long as the functionality monitoring means 10 determines that all of the drive motors are fully operational; otherwise, said functionality monitoring means selects a STOP 0.

If at this point the speed monitoring unit responds, while the functionality monitoring means 10 determines that all of the drive motors are fully operational or at least capable of functioning to a limited extent, then in a step S4 the fault reaction means 30 carries out the preselected STOP 2. This approach ensures that the robot can be decelerated with maximum path accuracy under low mechanical and motor load.

At the same time, the functionality monitoring means 10 continues to monitor the output torques and the operational capability.

If in this context a monitored torque, which is impressed by a drive motor, is too low, and/or a deviation of this torque from a target torque is too high, then the selection means 40 changes to a STOP 0, i.e., selects at this point this STOP 0 as the fault reaction (step S3). Correspondingly, in step S4 the fault reaction means 30 switches over immediately to STOP 0 and, as a result, switches faster than during a position-based monitoring of the braking ramp.

Even if the functionality monitoring means 10 determines that at least one of the drive motors is defective, i.e., is not fully operational or is at least capable of operating to a limited extent, the selection means 40 changes to the STOP 0. This approach allows the advantageous STOP 2 to be carried out as long as the drive motors are functioning satisfactorily; and a switch-over to the STOP 0 is performed only when or rather not until at least one drive motor has failed.

If the collision monitoring unit responds, while the functionality monitoring means 10 determines that all of the drive motors are fully operational, then in step S4 the fault reaction means 30 carries out the preselected compliance control. This approach makes it possible to minimize a force that the robot exerts on the collision partner.

If, however, the functionality monitoring means 10 determines that at least one of the drive motors is not fully operational, i.e., is defective or is capable of operating only to a limited extent, then the selection means 40 changes to the STOP 0. This approach allows the advantageous compliance control to be carried out as long as the drive motors are functioning satisfactorily, and a switch-over to the STOP 0 is performed only when or rather not until at least one drive motor has been appropriately restricted.

The fault reaction means 30 is implemented in safe technology and, as a result, represents a second control means for controlling the drive motors during a fault reaction. As indicated in FIG. 1, this safe control means takes over the control of the drive motor, when the robot monitoring unit responds. This approach allows the robot to be controlled by the first control means 50 in the normal operating mode and during a fault reaction by the second control means or more specifically the fault reaction means 30.

As indicated in FIG. 1, the functionality monitoring means 10 has a determination means 11 for determining the above described parameters of the drive motors and a comparison means 12 for comparing these parameters with a given specification. As explained above, the determination means 11 determines, for example, the output torques of the drive motors, as indicated by way of example for the drive motor 1.1, and compares these output torque levels with the specified torque limit values and/or torque profiles.

LIST OF REFERENCE NUMERALS 1 robot
1.1 drive motor
2 control cabinet (control means)
10 functionality monitoring means
11 determination means
12 comparison means
20 robot monitoring means
30 fault reaction means (second control means)
40 selection means
50 first control means
S1 S4 process steps

What is claimed is:
1. A method for controlling a robot, the method comprising:
monitoring at least one of an operational capability of, or an output variable that is developed by, at least one motor of the robot; and carrying out a fault reaction, wherein the fault reaction is selected from a plurality of specified fault reactions on the basis of the monitoring of the robot;

wherein the plurality of specified fault reactions comprises:
- at least one motor-active fault reaction, wherein the at least one motor of the robot is actuated, and
- at least one motor-passive fault reaction, wherein the at least one motor of the robot is not actuated.

2. The method of claim 1, wherein:
the at least one motor-active fault reaction includes at least one of a motor deceleration with or without a subsequent disconnecting from an energy source, a compliance control, or a retraction motion; and
the least one motor-passive fault reaction includes an immediate disconnection from the energy source without deceleration of the motor.

3. The method of claim 1, further comprising:
controlling the motor in a normal operating mode with a first control; and
controlling the motor during a fault reaction with a second control which is different from the first control.

4. The method of claim 1, wherein monitoring an operational capability comprises a classification of an operational capability, the classification having at least two steps.

5. The method of claim 4, wherein the classification has at least three steps.

6. The method of claim 1, wherein monitoring an operational capability comprises:
determining at least one parameter; and
comparing the at least one parameter with a specified parameter.

7. The method of claim 6, wherein the at least one parameter comprises an electromagnetic, a thermal, or a kinematic parameter of the motor.

8. The method of claim 1, wherein the fault reaction is selected before and/or while the fault reaction is carried out.

9. The method of claim 1, wherein the output variable comprises at least one of a force or an integral variable thereof.

10. The method of claim 9, wherein the force is a torque, and wherein the integral variable is at least one of work or power.

11. Controller for controlling a robot, the controller comprising:
a first monitoring component configured for monitoring the robot;
a second monitoring component configured for monitoring at least one of an operational capability or an output variable of at least one motor of the robot;
a fault reaction component configured for carrying out a fault reaction on the basis of the monitoring of the robot, the fault reaction selected from a plurality of specified fault reactions; and
a selection component configured for selecting the fault reaction on the basis of the monitoring of the at least one of an operational capability of or an output variable that is developed by at least one motor of the robot;
wherein the plurality of specified fault reactions comprises:
- at least one motor-active fault reaction, wherein the at least one motor of the robot is actuated, and
- at least one motor-passive fault reaction, wherein the at least one motor of the robot is not actuated.

12. The controller of claim 11, comprising:
a first controller configured for controlling the motor in a normal operating mode of the robot; and
a second controller different from the first controller and configured for controlling the motor during a fault reaction.

13. The controller of claim 11, wherein the second monitoring component comprises:
a determination-component configured for determining at least one parameter of the motor; and
a comparison component configured for comparing the determined parameter with a specified parameter.

14. The controller of claim 13, wherein the at least one parameter is an electromagnetic, a thermal, or a kinematic parameter of the motor.

15. The controller of claim 11, wherein the output variable comprises at least one of a force or an integral variable thereof.

16. The controller of claim 15, wherein the force is a torque, and wherein the integral variable is at least one of work or power.

17. A robot, comprising:
a plurality of drive motors; and
a controller for controlling the drive motors, the controller comprising:
a first monitoring component configured for monitoring the robot,
a second monitoring component configured for monitoring at least one of an operational capability or an output variable of at least one of the drive motors,
a fault reaction component configured for carrying out a fault reaction on the basis of the monitoring of the robot, the fault reaction selected from a plurality of specified fault reactions, and
a selection component configured for selecting the fault reaction on the basis of the monitoring of the at least one of an operational capability of, or an output variable that is developed by, at least one motor of the robot,
wherein the plurality of specified fault reactions comprises:
- at least one motor-active fault reaction, wherein the at least one motor of the robot is actuated, and
- at least one motor-passive fault reaction, wherein the at least one motor of the robot is not actuated.

18. Computer program product for controlling a robot, the computer program product having programming code stored on a non-transitory machine readable data medium, the programming code configured to, when executed by a computer, cause the computer to:
monitor at least one of an operational capability of, or an output variable that is developed by, at least one motor of the robot; and carry out a fault reaction on the basis of the monitoring of the robot, wherein the fault reaction is selected from a plurality of specified fault reactions;
wherein the plurality of specified fault reactions comprises:
- at least one motor-active fault reaction, wherein the at least one motor of the robot is actuated, and
- at least one motor-passive fault reaction, wherein the at least one motor of the robot is not actuated.

* * * * *